United States Patent [19]

Katsuma et al.

[11] Patent Number: 4,560,263

[45] Date of Patent: Dec. 24, 1985

[54] DRIVE SYSTEM FOR A VIBRATION WAVE MOTOR FOR LENS CONTROL

[75] Inventors: Makoto Katsuma, Kawasaki; Hiroyasu Murakami, Tokyo; Akira Hiramatsu, Yokohama, all of Japan

[73] Assignee: Canon Kabushiki Kaisha, Tokyo, Japan

[21] Appl. No.: 554,634

[22] Filed: Nov. 23, 1983

[30] Foreign Application Priority Data

Dec. 3, 1982 [JP] Japan ................................ 57-211284
Dec. 9, 1982 [JP] Japan ................................ 57-216000
Dec. 13, 1982 [JP] Japan ................................ 57-218025

[51] Int. Cl.[4] .......................... G03B 3/00; H01L 41/08
[52] U.S. Cl. .................................. 354/195.1; 310/317; 310/323; 310/328; 354/400
[58] Field of Search ........................ 310/317, 323, 328; 354/195.1, 400

[56] References Cited

U.S. PATENT DOCUMENTS 4,019,073  4/1977  Vishnevsky ........................ 310/323
4,484,099  11/1984  Kawai et al. .................... 310/328 X Primary Examiner—Mark O. Budd
Attorney, Agent, or Firm—Fitzpatrick, Cella, Harper & Scinto

[57] ABSTRACT

In a drive system for a vibration wave motor for generating a travelling vibration wave by friction-contacting a vibration member to a movable member and by electro-mechanical energy conversion means contained in one of the vibration member and the movable member to friction-drive the movable member, a standing vibration wave is generated by the electro-mechanical energy conversion means prior to the start.

23 Claims, 7 Drawing Figures

DRIVE SYSTEM FOR A VIBRATION WAVE MOTOR FOR LENS CONTROL

BACKGROUND OF THE INVENTION

1. Field of the Invention

The present invention relates to a drive system for a vibration motor which utilizes a mechanical vibration wave by electromechanical energy conversion means such as an electrostrictive element or a magnetostrictive element.

2. Description of the Prior Art

As taught in U.S. Pat. No. 4,019,073, a vibration motor converts a vibration motion generated when a periodic voltage is applied to an electrostrictive element to a rotational motion or a one-dimensional motion. Since it needs no wiring unlike a conventional motor, it is simple in construction and compact, provides a high torque even at a low rotating speed and has a low inertia rotation.

However, the known vibration wave motor transduces the standing wave vibration motion generated in the vibration member to a unidirectional motion of the movable member by friction-driving the movable member such as a rotor which contacts to the vibration member In order to reverse the direction of the motion, a mechanical structure for changing a contact position or a contact angle between the vibration member and the movable member is necessary. Accordingly, in order to forwardly and reversely rotate the vibration wave motor, a large scale device is needed and a characteristic feature of the vibration wave motor, that is, the simple construction and the compactness is lost.

In order to resolve the above problem, a vibration wave motor driven by a travelling vibration wave has recently been proposed. A structure of such a vibration wave motor is shown in FIG. 1. A vibration absorber 4, a metal ring vibration member 2 having electrostrictive elements 3a and 3b bonded on a surface facing the absorber 4 and a movable member 1 are inserted in this order in a central cylinder 5a of a stator 5 which serves as a base, and the stator 5, the absorber 4, the electrostrictive elements 3a and 3b and the vibration member 2 are mounted not to rotate with respect to each other. The movable member 1 is press-contacted to the vibration 2 by its gravity or urging means, not shown, to maintain the integrity of the motor.

A plurality of electrostrictive elements 3a are arranged at a pitch equal to one half of a wavelength $\lambda$ of the vibration wave and a plurality of electrostrictive elements 3b are also arranged at a pitch of $\lambda/2$. The electrostrictive elements 3a (or 3b) may be a single element polarized at the pitch of $\lambda/2$. The electrostrictive elements 3a and 3b are phase-differentially arranged at a mutual pitch of $(n_0+\frac{1}{4})\lambda$ where $n_0=1, 2, 3, \ldots$ Lead wires 7 are connected to the electrostrictive elements 3a and lead wires 9 are connected to the electrostrictive elements 3b, and they are connected to an AC power supply 6 and a 90° phase shifter 8, respectively (see FIG. 2). A lead wire 10 is connected to the metal vibration member 2 and it is connected to the AC power supply 6.

A friction area 1a of the vibration member 1 is formed by a hard rubber to enhance a friction force and reduce abrasion, and it is press-contacted to the vibration member 2.

FIG. 2 shows a generation of the vibration wave of the motor. The electrostrictive elements 3a and 3b bonded to the metal vibration member 2 are shown adjacently for the sake of convenience but they meet the requirement of $\lambda/4$ phase shift and are essentially equivalent to the arrangement of the electrostrictive elements 3a and 3b of the motor shown in FIG. 1. Symbols $\oplus$ in the electrostrictive elements 3a and 3b indicate that they expand in a positive cycle of the AC voltage and symbols $\ominus$ indicate that they shrink in the positive cycle.

The metal vibration element 2 is used as one electrode to the electrostrictive elements 3a and 3b, and an AC voltage $V = V_0 \sin \omega t$ is applied to the electrostrictive elements 3a from the AC power supply 6 while an AC voltage $V = V_0 (\omega t \pm \pi/2)$ which is shifted by $\lambda/4$ is applied to the electrostrictive elements 3b from the AC power supply 6 through the 90° phase shifter 8. Signs $+$ and $-$ in the equation are switched by the phase shifter 6 depending on the direction of motion of the movable member 1 (not shown in FIG. 2). When the sign $+$ is selected, the phase is shifted by $+90°$ and the movable member 1 is moved forwardly, and when the sign $-$ is selected the phase is shifted by $-90°$ and the movable member is moved reversely. Let us assume that the sign $-$ is selected and the voltage $V = V_0 \sin (\omega t - \pi/2)$ is applied to the electrostrictive elements 3b. When only the electrostrictive elements 3a are vibrated by the voltage $V = V_0 \sin \omega t$, a standing wave vibration is generated as shown in FIG. 2(a), and when only the electrostrictive elements 3b are vibrated by the voltage $V = V_0 \sin (\omega t - \pi/2)$, a standing wave vibration is generated as shown in FIG. 2(b).

When the two AC voltages having the phase shift are simultaneously applied to the electrostrictive elements 3a and 3b, the vibration wave travels. FIG. 2(a) shows a waveform at time $t = 2n\pi/\omega$, FIG. 2(b) shows a waveform at time $t = \pi/2\omega + 2n\pi/\omega$, FIG. 2(c) shows a waveform at time $t = \pi/\omega + 2n\pi/\omega$ and FIG. 2(d) shows a waveform at $t = 2\pi/2\omega + 2n\pi/\omega$. A wavefront of the vibration wave travels in the x-direction.

Such a travelling vibration wave includes a longitudinal wave and a lateral wave. Looking at a mass point A of the vibration member 2 as shown in FIG. 3, a longitudinal amplitude u and a lateral amplitude w create a counterclockwise rotating elliptic motion. The movable member 1 is press-contacted to the surface of the vibration member 2 (arrow P) and contacts only an apex of the vibration plane. Thus, it is driven by the longitudinal amplitude components of the elliptic motion of the mass points A, A', ... at the apex and is moved in a direction of an arrow N.

A velocity of the mass point A at the apex is $V = 2\pi fu$ (when f is a vibration frequency) and a velocity of the movable member 1 depends on it and also depends on the lateral amplitude w because of the friction drive by the press contact. Thus, the velocity of the movable member 1 is proportional to the magnitude of the elliptic motion of the mass point A and the magnitude of the elliptic motion is proportional to the voltage applied to the electrostrictive elements.

In starting such a vibration wave motor, a long time is required to start up the motor. When the travelling vibration wave is generated by a drive start signal to change status from a stop status to an operation status, the elliptic motion gradually grows by the vibration energy of the electrostrictive elements in a transient period before a steady state, and after a certain time period, it becomes steady. That is, the certain time period is required before the vibration energy of the electrostrictive elements which is initially zero is converted to the longitudinal vibration energy and the lateral vibration energy of the stable travelling vibration wave.

Further, since the movable member 1 is in press-contact to the vibration member 2 even when the electrostrictive elements do not vibrate, a large force is needed to manually move the movable member 1.

It is an object of the present invention to provide a drive system for a vibration wave motor which can improve a start-up characteristic.

It is another object of the present invention to provide a drive system for a vibration wave motor which generates a standing vibration wave in a manual operation mode to improve an operability.

Other objects of the present invention will be apparent from the description of the preferred embodiments.

DETAILED DESCRIPTION OF THE PREFERRED EMBODIMENTS

One embodiment of the present invention is now described with reference to FIGS. 4 and 5.

Figure 1:
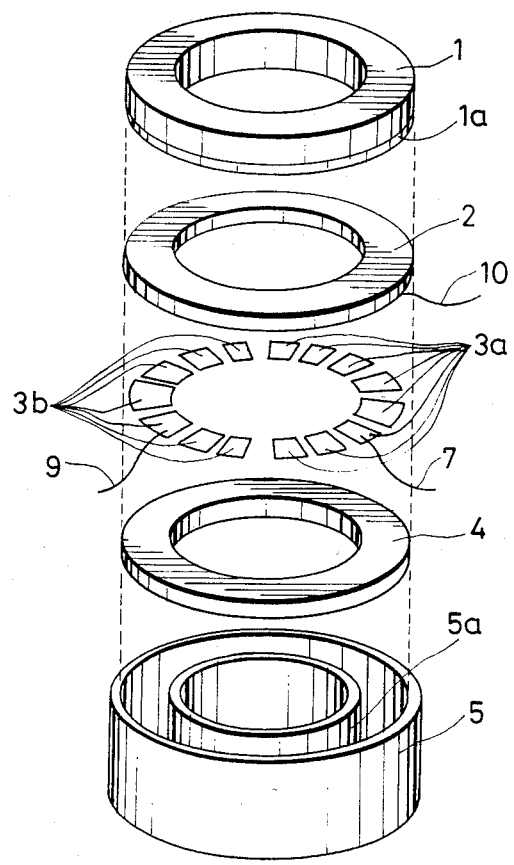
FIG. 1 is a developed perspective view showing a basic construction of a vibration motor.
Figure 2:
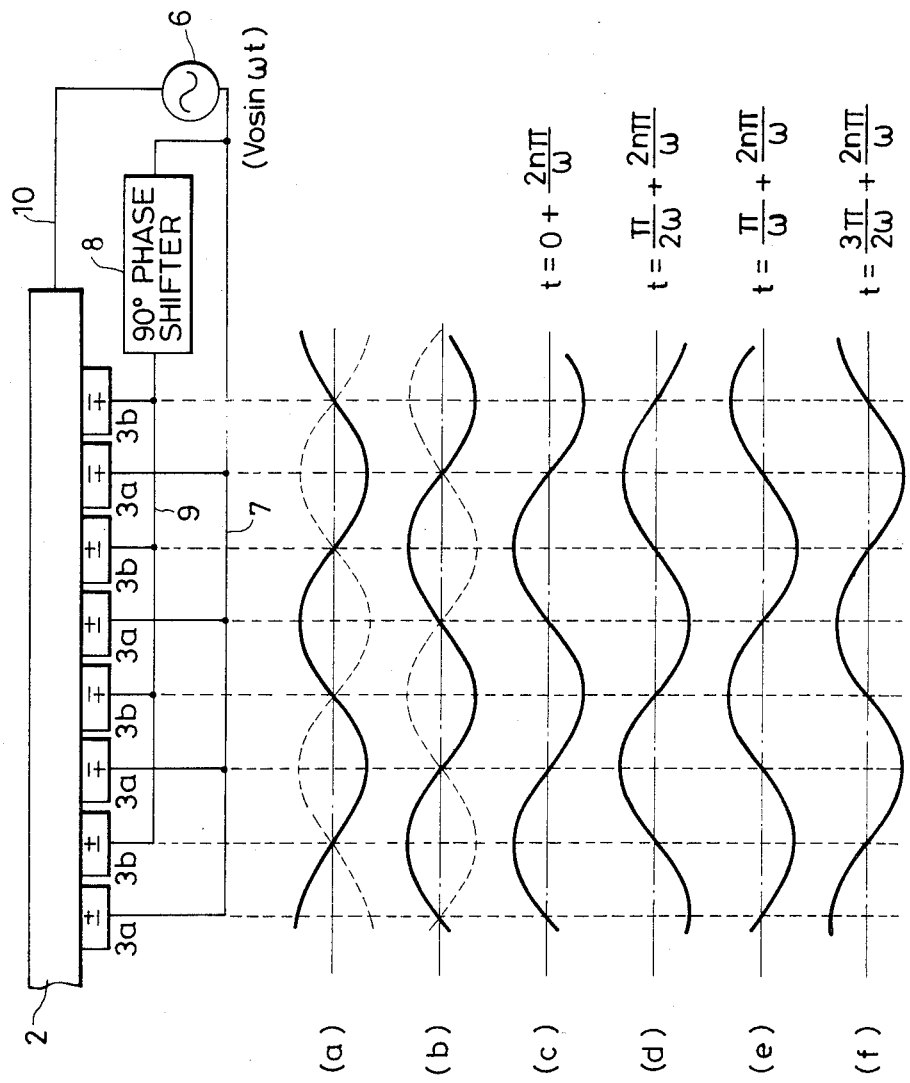
FIG. 2 illustrates generation of a travelling vibration wave and a standing vibration wave in the vibration wave motor shown in FIG. 1.
Figure 3:
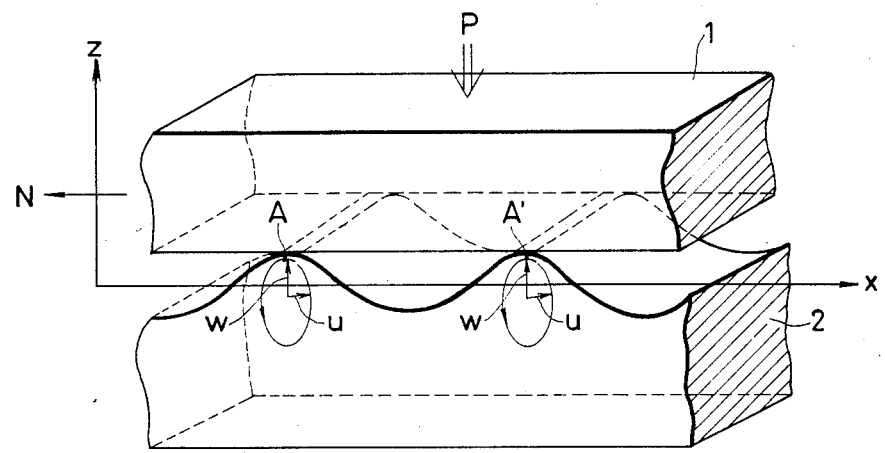
FIG. 3 illustrates a principle of drive of the vibration wave motor.
Figure 4:
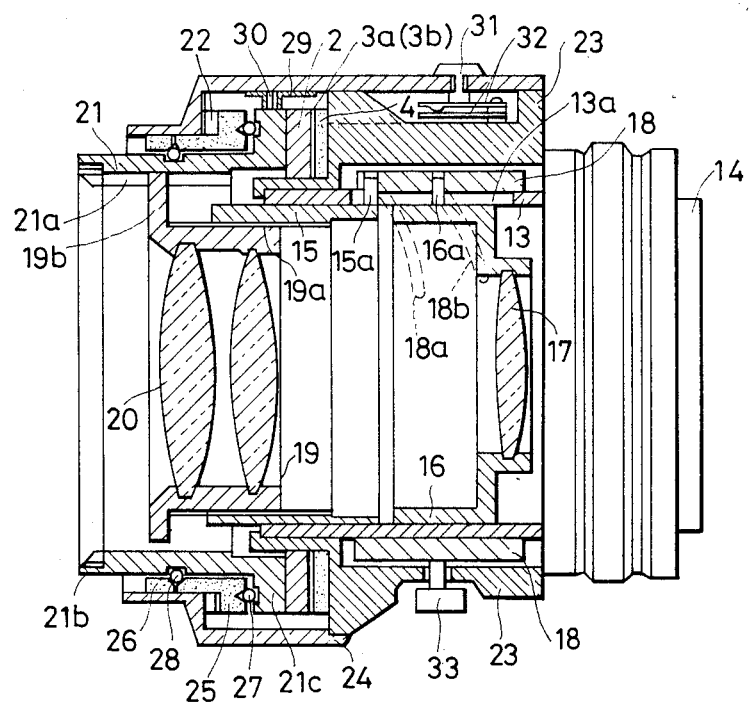
FIG. 4 is a sectional view of a lens drive unit which uses the vibration wave motor shown in FIG. 1, in accordance with one embodiment of the present invention.

FIG. 4 shows a zoom lens drive unit having the vibration wave motor shown in FIG. 1. The like elements to those shown in FIG. 1 are designated by like numerals.

A mount member 14 such as bayonet or screw mount to be attached to a camera is mounted at a rear end of a stationary cylinder 13 of a lens barrel. A straight groove 13a is formed in the stationary cylinder 13 along an optical axis. Lens holding cylinders 15 and 16 are inserted in the stationary cylinder 13 and they hold an optical lens system 17 which magnifies or reduces an image and correct aberration. Pins 15a and 16a are mounted on the lens holding cylinders 15 and 16, respectively, and they engage with cam grooves 18a and 18b of a cam cylinder 18 mounted around the stationary cylinder 13, through the straight groove 13a. A lens holding cylinder 19 holds a focusing optical lens system 20 and has a thread 19a formed on an outer surface thereof to threadedly engage with the lens holding cylinder 15, and a flange 19b which is inserted in a straight groove 21a formed in an inner periphery of a distance adjusting ring 21 along the optical axis. A grip 21b is formed at an end of the distance adjusting ring 21. A friction contact area 21c of the distance adjusting ring 21 corresponds to the movable member 1 of FIG. 1 and it is press-contacted to the vibration member 2 by a ring-shaped lead spring 22. A base cylinder 23 is fixed to the stationary cylinder 13 by a bolt (not shown) and supports the vibration member 2, the electrostrictive elements 3a and 3b and the absorber 4.

An outer cylinder 24 is bolted to the base cylinder 23, and a first bearing ring 25 and a second bearing ring 26 are mounted in the outer cylinder 24. The first ring 25 is urged to the friction contact area 21c of the distance adjusting ring 21 by the leaf spring 22 through a ball bearing 27. The second ring 26 is threadedly mounted in the inner periphery of the outer cylinder 24. A V-shaped circumferential groove is formed at a junction of the first ring 25 and the second ring 26, and a ball bearing 28 is held between the circumferential groove and a generally U-shaped circumferential groove formed in the outer periphery of the distance adjusting ring 21. Thus, the distance adjusting ring 21 is rotatably mounted to the outer cylinder 24 and the rotatable friction contact of the friction contact area 21c to the vibration member 2 is secured.

An encoding plate 29 has a comb-shaped electrode and is mounted on an inner wall of the outer cylinder 24. As a slider 30 fixed to the distance adjusting ring 21 slides on the comb-shaped electrode, a distance monitor signal consisting of a number of pulses corresponding to a rotation angle of the distance adjusting ring 21, that is, a distance of movement of the focusing optical lens system 20 is generated.

An auto/manual selection switch 31 is mounted on the outer cylinder 24 and a contact 32 thereof is mounted on the base cylinder 23. An actuation pin 33 is mounted on the cam cylinder 18. As it is rotated around the optical axis externally of the base cylinder 23, the cam cylinder 18 is rotated. As the cam cylinder 18 is rotated, the cam grooves 18a and 18b move the pins 15a and 16a along the straight groove 13a so that the lens holding cylinders 15 and 16 are moved along the optical axis to magnify or reduce the image and correct the aberration.

Figure 5:
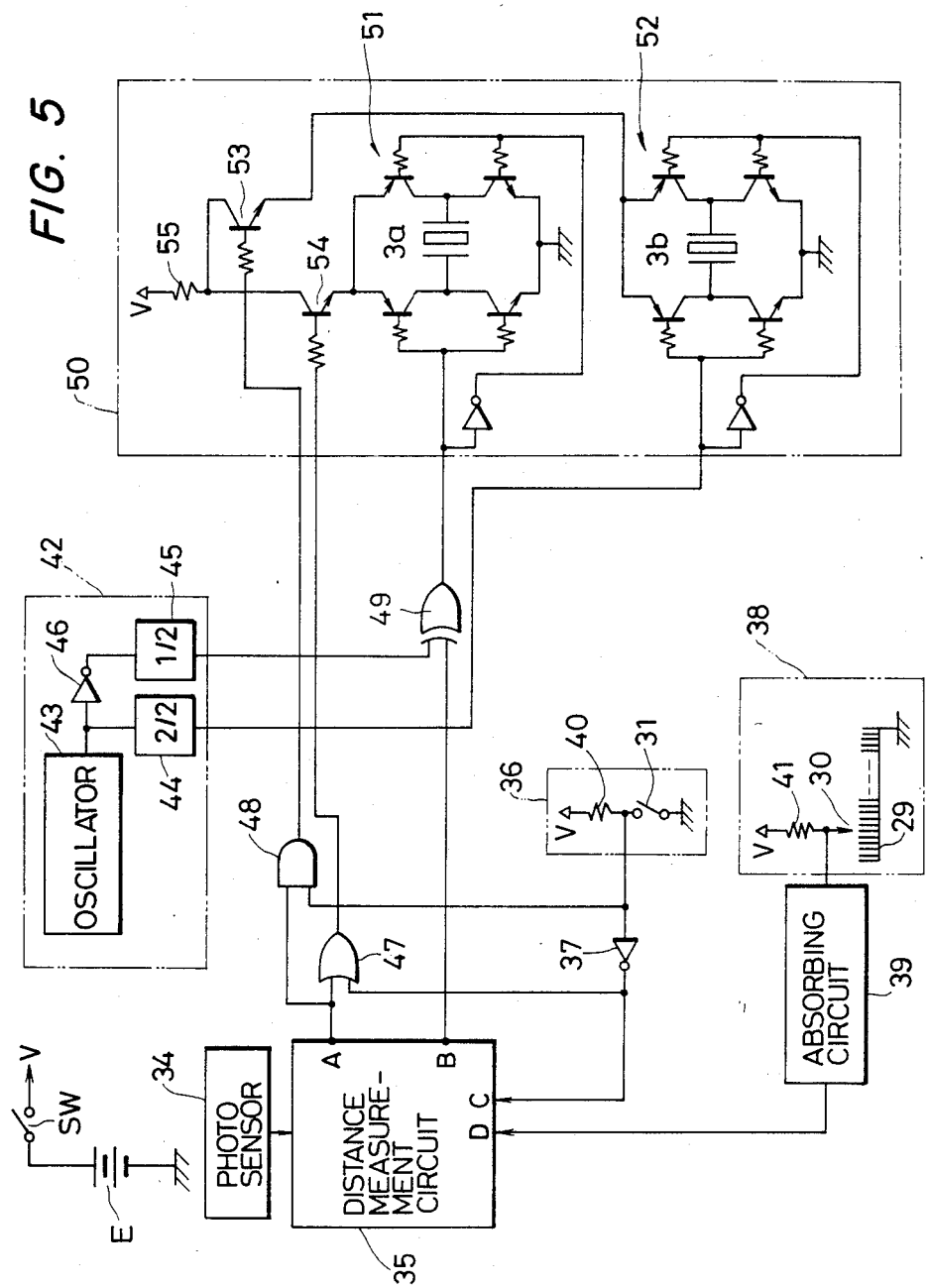
FIG. 5 shows a drive circuit for the lens drive unit shown in FIG. 4.

FIG. 5 shows a drive circuit for the lens drive unit of FIG. 4. A photo-sensor 34 for automatic focusing may be a charge coupled device (CCD) and it is connected to a distance measurement circuit 35. An output terminal A of the distance measurement circuit 35 supplies a high level drive signal or a low level stop signal to the vibration wave motor, an output terminal B supplies a high level near drive signal or a low level far drive signal, an input terminal C receives a selection signal from a auto/manual selection circuit 36 through an inverter 37 and an input terminal D receives a distance monitor signal from a monitor signal generator 38 through a chattering absorbing circuit 39. The auto/manual selection circuit 36 comprises an auto/manual selection switch 31 and a resistor 40, and the monitor signal generator 38 comprises the encoding plate 29, the slider 30 and a resistor 41. A pulse generator 42 comprises an oscillator 43, 1-to-2 frequency dividers 44 and 45 and an inverter 46, and produces pulses of 90° phase difference therebetween from the frequency dividers 44 and 45. Numeral 47 denotes an OR gate, numeral 48 denotes an AND gate and numeral 49 denotes an exclusive OR gate. The exclusive OR gate 49 advances the phase of the pulse of the frequency divider 45 by 90° with respect to the pulse of the frequency divider 44 when the signal from the output terminal B of the distance measuring circuit 35 is high level, and retards it by 90° when the input signal is low level.

A drive control circuit 50 controls the drive of the electrostrictive elements 3a and 3b and comprises two push-pull circuits 51 and 52 each including transistors, resistors and inverters, and switching transistors 53 and 54. The switching transistors 53 and 54 are connected to a power supply E through a resistor 55 and a lens drive power switch SW.

The operation of the embodiment of FIGS. 4 and 5 is now explained. When the lens drive power switch SW is turned on, the auto/manual selection circuit 36, the inverter 37, the OR gate 47, the AND gate 48, the exclusive OR gate 49, the pulse generator 42 and the drive control circuit 50 are powered and the pulse generator 42 starts the operation.

When the auto/manual selection switch 31 is turned off to select the auto-drive, the auto/manual selection circuit 36 produces the high level selection signal so that the AND gate 48 is opened. The selection signal is inverted by the inverter 37 to the low level signal, which is applied to the input terminal C of the distance measurement circuit 35.

When a two-stroke release button of the camera is depressed to a first stroke, a light measurement operation is started. The distance measurement circuit 35 discriminates the auto-drive mode by the low level signal to the input terminal C and starts an auto-focusing operation and sets a focusing range to a narrow range for the auto-focusing. The photo-sensor 34 senses a light reflected by an object and the distance measuring circuit 35 detects a focusing error by a known contrast detection method or a deviation detection method based on the object information from the photo-sensor 34 to calculate a lens drive quantity and a drive direction. The lens drive quantity is set in a counter (not shown) in the distance measurement circuit 35. The output terminal A produces the high level drive signal. Assuming that the object is at near position, the output terminal B produces the high level near drive signal. As a result, the OR gate 47 and the AND gate 48 produce the high level signals to turn on the switching transistors 53 and 54. As a result, the push-pull circuits 51 and 52 are powered. Since the pulse generator 42 is in operation and the pulse of the frequency divider 44 directly controls the push-pull circuit 52, a high frequency power is supplied to the electrostrictive elements 3b. The pulse of the frequency divider 45 is inverted by the exclusive OR gate 49 so that it is advanced by 90° with respect to the pulse of the frequency divider 44. Since the pulse of the frequency divider 45 controls the push-pull circuit 51, a 90°-advanced high frequency power is supplied to the electrostrictive elements 3a. As a result, a travelling vibration wave 12 is generated in the vibration member 2 and the distance adjusting ring 21 is rotated in the focusing direction. Thus, the lens holding cylinder 19 is rotated while it threadedly engages with the lens holding cylinder 15 and hence it is rotated in the extending direction toward the focusing region.

As the distance adjusting ring 21 is rotated, the slider 30 slides on the encoding plate 29 so that the distance monitor signal consisting of a number of pulses corresponding to the lens drive quantity is generated. The distance monitor signal is applied to the input terminal D of the distance measurement circuit 35 and decrements the lens drive quantity preset in the counter. When the count of the counter reaches zero, the output terminal A produces the low level stop signal so that the outputs of the OR gate 47 and the AND gate 48 are changed to the low level. As a result, the switching transistors 53 and 54 are turned off, the electrostrictive elements 3a and 3b are deenergized and the drive of the distance measurement ring 21 is stopped. Then, the distance is again measured by the photo-sensor 34 and the distance measurement circuit 35, and if the focusing error is within an in-focus range, an in-focus state is indicated. If it is not in the in-focus range, the lens is again driven in the same manner.

When the object is at a far position, the output terminal B of the distance measurement circuit 35 produces the low level far drive signal. Thus, the exclusive OR gate 49 gates the pulse of the frequency divider 45 as it is so that the pulse from the exclusive OR gate 49 is 90° retarded with respect to the pulse from the frequency divider 44. As a result, the electrostrictive elements 3a and 3b generate a travelling vibration wave which travels reversely so that the distance adjusting ring 21 is rotated reversely to move the lens holding cylinder 19 in the retracting direction.

When the auto/manual selection switch 31 is turned on to select the manual drive mode, the auto/manual selection circuit 36 produces the low level signal and the OR gate 47 produces the high level output to turn on the switching transistor 54. On the other hand, the AND gate 48 produces the low level output to turn off the switching transistor 53. Accordingly, no high frequency power is supplied to the electrostrictive elements 3b but the high frequency power is supplied only to the electrostrictive elements 3a. As a result, a standing vibration wave is generated in the vibration member 2 and a frictional torque of the vibration member 2 and the distance adjusting ring 21 is reduced. Thus, the distance adjusting ring 21 can be manually rotated by the grip 21b at the end of the outer cylinder 24 with a low torque so that the lens holding cylinder 19 is moved along the optical axis.

The distance measurement circuit 35 discriminates the manual drive mode by the high level signal to the input terminal C and sets a wide in-focus range for the manual drive mode, and indicates the in-focus state when the focusing optical lens system 20 comes within the in-focus range.

As described hereinabove, according to the present embodiment, there are provided the auto/manual selection means and control means which causes the electro-mechanical energy conversion means to generate the travelling vibration wave in the autodrive mode and causes the electro-mechanical energy conversion means to generate the standing vibration wave in the manual mode so that the friction contact between the vibration member and the movable member assumes the dynamical friction state in the manual mode, the coefficient of friction is reduced and the contact area is reduced. Accordingly, the load in manually driving the lens is reduced without complicating the construction and hence the manual operability is improved.

Figure 6:
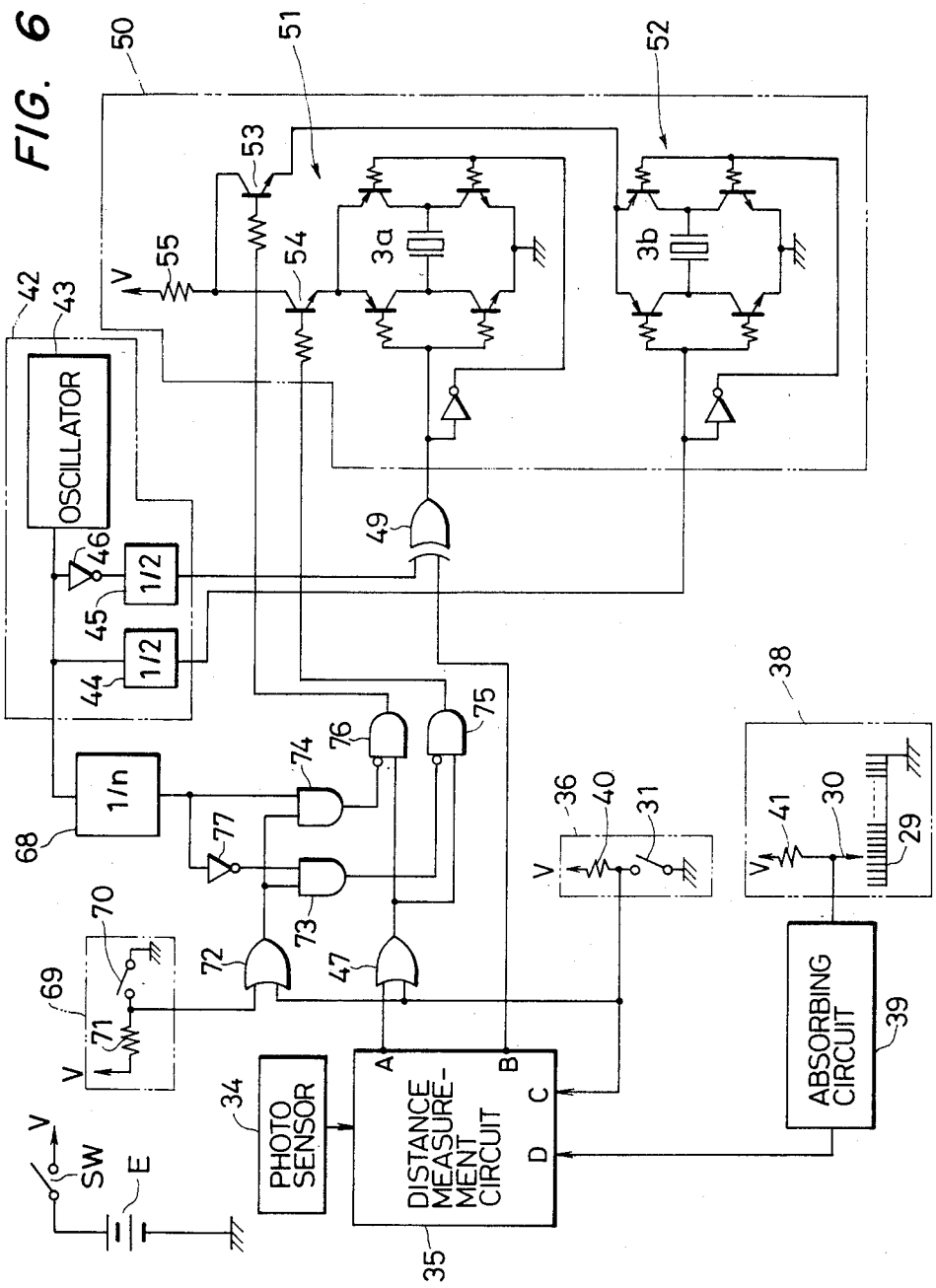
FIG. 6 shows a modification of the drive circuit of FIG. 5.

FIG. 6 shows a modification of FIG. 5. The like elements to those shown in FIG. 5 are designated by like numerals and the explanation thereof is omitted. The selection signal from the auto/manual selection circuit 36 is supplied to the OR gates 72 and 47. The auto/manual selection circuit 36 comprises the auto/manual selection switch 31 and the resistor 41, and is supplied with the voltage V from the power supply E when the power switch SW is turned on by the first stroke of the release button of the camera. The auto/manual selection switch 31 is turned on in the auto mode and turned off in the manual mode. A frequency divider 68 frequency - divides the output pulse of the oscillator 43 such that the output pulse of the frequency divider 68 has a longer period than those of the pulses of the frequency dividers 44 and 45. A lens drive start signaling circuit 69 comprises a lens drive start switch 70 and a resistor 71 connected to the power supply. The lens drive start switch 70 may be a switch which is turned on a predermined time after the first stroke of the release button, a switch which is turned on in the second stroke of the release button if the release button is of three-stroke type, or a switch which is independent from the release button is turned on. Numerals 72 and 74 denote OR gates, numerals 73–76 denote AND gates, numeral 77 denotes an inverter and numeral 49 denotes an exclusive OR gate.

The operation of the circuit of FIG. 6 is now explained. When the release button of the camera is depressed to the first stroke and a power switch (not shown) is turned on, the voltage V is supplied to the auto/manual selection circuit 36 and the drive control circuit 50. The power is also supplied to the photo-sensor 34, the distance measurement circuit 35 and other circuits, and the pulse generator 42 and the frequency divider 68 start the operation.

When the auto/manual selection switch 31 is turned off to select the manual drive mode, the OR gate 72 produces the high level signal without regard to the position of the lens drive start switch 70. Thus, the AND gates 73 and 74 are opened. Since the OR gate 47 produces the high level signal without regard to the signal level at the output terminal A of the distance measurement circuit 35, the AND gates 75 and 76 are opened.

The light measurement operation is started and the distance measurement circuit 35 starts the auto-focusing operation. The photo-sensor 34 receives a light reflected from an object and the distance measurement circuit 35 detects a focusing error by a known contrast detection method or a deviation detection method based on the object information from the photo-sensor 34, and calculates the lens drive quantity and the drive direction. The lens drive quantity is set in a counter (not shown) in the distance measurement circuit 35. The output terminal A produces the high level drive signal. Assuming that the object is at a near position, the output terminal B produces the high level near drive signal.

When the output of the frequency divider 68 is high level, the AND gate 73 produces the low level output and the AND gate 75 produces the high level output. Thus, the switching transistor 54 is turned on. On the other hand, since the AND gate 74 produces the high level output and the AND gate 76 produces the low level output, the switching transistor 53 is turned off. As a result, the electrostrictive elements 3b is not powered and the high frequency power is supplied only to the electrostrictive elements 3a from the push-pull circuit 51 which is controlled by the pulse of the frequency divider 45. As a result, a standing vibration wave is generated in the vibration member 2. Conversely, when the output of the frequency divider 68 is low level, the AND gate 76 produces the high level output and only the switching transistor 73 is turned on. As a result, the high frequency power is supplied only to the electrostrictive elements 3b and a standing vibration wave is generated in the vibration member 2. The frictional torque of the vibration member 2 and the distance adjusting ring 21 is reduced by the standing vibration wave. Thus, the distance adjusting ring 21 can be manually rotated by the grip 21b at the end of the outer cylinder 24 with a small torque so that the lens holding cylinder 19 is moved along the optical axis.

The standing vibration waves are alternately generated by the electrostrictive elements 3a and 3b in order to disperse a local abrasion and a local fatigue of the friction contact area 21c of the distance adjusting ring 21. If only the electrostrictive elements 3a are used, a loop area of the standing vibration wave is determined by a physical position of the electrostrictive elements 3a and the local abrasion and the local fatigue occur in the distance adjusting ring 21.

When the auto/manual selection switch 31 is turned on to select the auto-drive mode and the release button is depressed to the first stroke to turn on the power switch (not shown), the output terminal A of the distance measurement circuit 35 produces the high level signal if it is not in the in-focus state. Thus, the OR gate 47 produces the high level signal. The OR gate 72 produces the high level signal until the lens drive start switch 70 is turned on. Accordingly, the electrostrictive elements 3a and 3b alternately generate the standing vibration waves in the same manner as the manual drive mode and the vibration member 2 stores the vibration energy to prepare for the lens drive. A predetermined time later from the first stroke of the release button, or at a second stroke of the release button (for the three-stroke release button), or by an operation independent from the release button, the lens drive start switch 70 is turned on and the lens drive start signalling circuit 69 produces the low level lens drive start signal. As a result, the OR gate 72 produces the low level signal and the AND gates 73 and 74 produce the low level signals. Thus, the AND gates 75 and 76 produces the high level signals to turn on the switching transistors 54 and 55. As a result, the voltage V is supplied to the push-pull circuits 51 and 52. Since the pulse generator 42 is in operation and the pulse of the frequency divider 44 directly controls the push-pull circuit 52, the high frequency power is supplied to the electrostrictive elements 3b. When the object is at the near position, the output terminal B of the distance measurement circuit 35 produces the high level near drive signal. As a result, the pulse of the frequency divider 45 is inverted by the exclusive OR gate 49 so that the pulse of the frequency divider 45 is in 90° advance to the pulse of the frequency divider 44. Since the pulse of the frequency divider 45 controls the push-pull circuit 51, the 90° advanced high frequency power is supplied to the electrostrictive elements 3a. Thus, a travelling vibration wave is generated in the vibration member 2 and it immediately reaches the steady state and the distance adjusting ring 21 is rotated in the in-focus direction. Since the lens holding cylinder 19 is rotated in union with the distance adjusting ring 21 while it threadedly engages with the lens holding cylinder 15, it is moved in the extending direction and reaches the in-focus region.

As the distance adjusting ring 21 is rotated, the slider 30 slides on the encoding plate 29 to generate the distance monitor signal consisting of a number of pulses corresponding to the lens drive quantity. The distance monitor signal is applied to the input terminal D of the distance measurement circuit 35 to decrement the lens drive quantity preset in the counter. When the count of the counter reaches zero, the output terminal A produces the low level stop signal and the outputs of the OR gate 72 and the AND gates 75 and 76 change to the low level. Accordingly, the switching transistors 54 and 53 are turned off and the electrostrictive elements 3a and 3b are deenergized and the drive of the distance adjusting ring 21 is stopped. The distance is again measured by the photo-sensor 34 and the distance measurement circuit 35, and if the focusing error is within the in-focus range, the in-focus state is indicated. If it is not in the in-focus range, the lens is driven in the same manner.

When the object is at the far position, the output terminal B of the distance measurement circuit 35 produces the low level far drive signal. Thus, the exclusive OR gate 49 gates the pulse of the frequency divider 45 as it is so that it is 90 retarded with respect to the pulse of the frequency divider 44. Accordingly, a travelling vibration wave which travels reversely is generated in the electrostrictive elements 3a and 3b, and the distance adjusting ring 21 is rotated reversely to move the lens holding cylinder 19 in the retracting direction.

When the in-focus state is reached, the release button is further depressed and a series of photographing operations are started.

In accordance with the present embodiment, since the distance adjusting ring 21 can be readily moved in the manual focusing mode, the manual operability is improved. Further, the distance adjusting ring 21 is moved at a high response in the autofocusing mode.

As described hereinabove, according to the present invention, there are provided the auto/manual selection means and control means which causes the electromechanical energy conversion means to generate the travelling vibration wave in the auto-drive mode and causes the electro-mechanical energy conversion means to generate the standing vibration wave in the manual mode so that the friction contact between the vibration member and the movable member assumes the dynamical friction state in the manual mode, the coefficient of friction is reduced and the contact area is reduced. Accordingly, the load in manually driving the lens is reduced without complicating the construction and hence the manual operability is improved.

Figure 7:
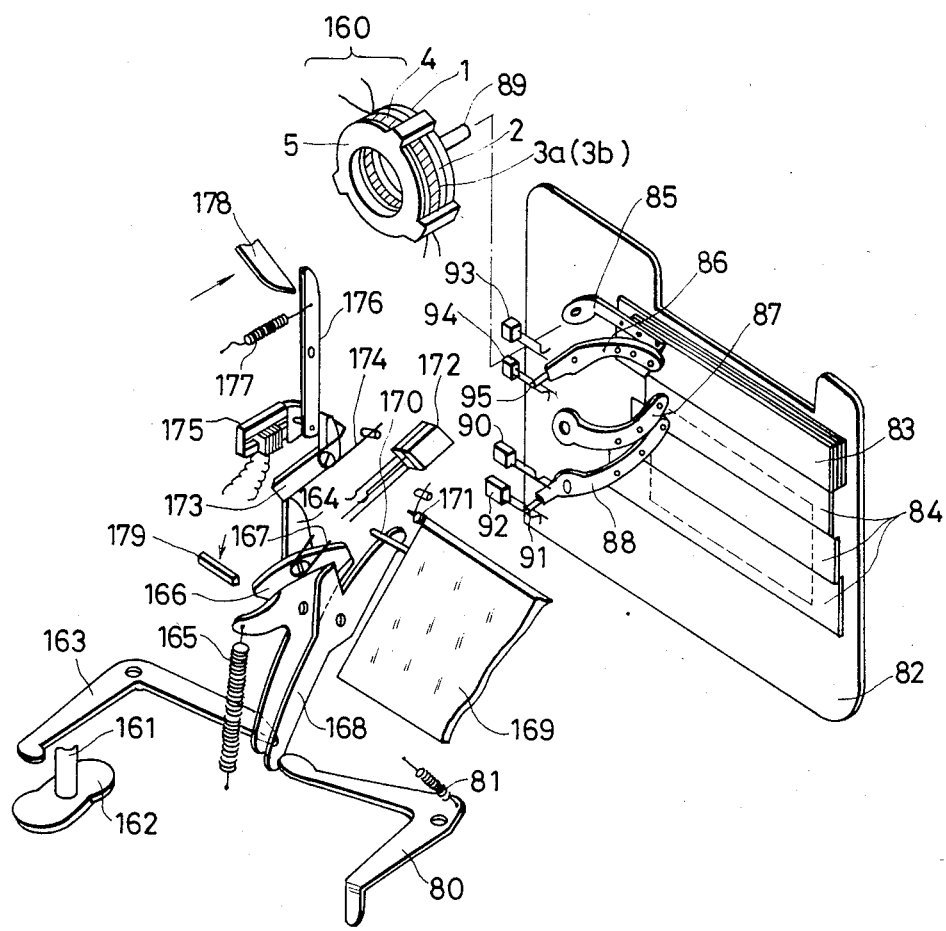
FIG. 7 shows a shutter drive unit which uses the vibration wave motor of FIG. 1, in accordance with another embodiment of the present invention.

FIG. 7 shows a shutter mechanism when the camera is in a charged state. Numeral 161 denotes a take-up shaft, numeral 162 denotes a take-up cam which is rotated in union with the take-up shaft 161, numeral 163 denotes a take-up lever which is rotated clockwise by the take-up cam 162 to charge a mirror drive lever 164 against a main spring 165, numeral 166 denotes a clutch which is supported on the mirror drive lever 164 and biased by a spring 167 to engage with a mirror lift lever 168, numeral 169 denotes a mirror, numeral 170 denotes a mirror pin which is pushed by the mirror lift lever 168 to lift the mirror 169 against a mirror return spring 171, numeral 172 denotes a switch which is turned on by the mirror pin 170 when the mirror 169 is lifted to cause a vibration wave motor 166 to generate a standing vibration wave for a predetermined time period by a circuit (not shown) and then causes it to generate a travelling vibration wave, numeral 173 denotes a stop lever, numeral 174 denotes a spring to bias the stop lever, numeral 175 denotes a release magnet which normally attracts an armature and releases the armature when energized, numeral 176 denotes a magnet lever which is rotated by a spring 177 when the release magnet 175 is energized to rotate the stop lever 173 clockwise to release the mirror drive lever 164, numeral 178 denotes a set lever, numeral 179 denotes a release lever which knocks an end of the clutch 166 in a direction of an arrow to release the engagement of the clutch 166 and the mirror lift lever 168, numeral 80 denotes a diaphragm drive lever which is pushed by the mirror lift lever 168 and rotated against a spring 81 to drive a diaphragm member (not shown) of a lens, numeral 82 denotes a shutter plate, numeral 83 denotes a shutter trailing curtain, numeral 84 denotes a shutter leading curtain, numeral 85 denotes a trailing curtain drive lever which supports the shutter trailing curtain 83 with a trailing curtain auxiliary lever 86, and numeral 87 denotes a leading curtain drive lever which supports the shutter leading curtain 84 with a leading curtain auxiliary lever 88.

A rotary shaft 89 of a vibration wave motor 160 is coupled to rotate the trailing curtain drive lever 85. A rotary shaft of a vibration wave motor for driving the leading curtain is coupled to the leading curtain drive lever 87 in the same manner. A switch 90 generates an end of leading curtain movement signal. It is turned on and off by a pin 91 mounted on the leading curtain auxiliary lever 88. It is turned on when the leading curtain movement is over to stop the vibration wave motor for the leading curtain. A leading curtain reset switch 92 is turned on by the pin 91 when the leading curtain 84 is returned to a home position after the photographing operation to stop the vibration wave motor for the leading curtain. A switch 93 for generating an end of trailing curtain movement signal and a trailing curtain reset switch 94 are turned on and off by a pin 95 in a similar manner to control the vibration wave motor 160.

The operation is now explained. When the shutter is released by the release button of the camera, the release magnet 175 is energized and the magnet lever 176 is released and rotated counterclockwise by the spring 177. Thus, the stop lever 173 is rotated against the spring 174 to release the engagement of the mirror drive lever 164. The mirror drive lever 164 is rotated counterclockwise by the main spring 165 to rotate the mirror lift lever 168 counterclockwise through the clutch 166 to lift the mirror 169. The diaphragm drive lever 80 stops the diaphragm of the lens. As the mirror 169 is lifted, the switch 172 is turned on to cause the vibration wave motor 160 and the leading curtain vibration wave motor to generate the standing vibration waves and then the travelling vibration waves after the predetermined time period. As a result, the leading curtain drive lever 87 and the trailing curtain drive lever 85 are rotated to drive the leading curtain 84 and the trailing curtain 83, respectively. The vibration wave motors for the leading curtain 84 and the trailing curtain 83 are stopped when the switch 90 and the switch 93 are turned on, respectively.

After the photographing operation, the film is taken up by the take-up mechanism and the vibration wave motors are rotated in the opposite direction to that of the exposure operation to return the leading curtain 84 and the trailing curtain 83 to their home positions. The magnet lever 171 is charged to the initial position by the set lever 78 and the take-up lever 163 is rotated clockwise by the take-up cam 162 to return the mirror drive lever 164 to the initial position where it engages with the stop lever 173.

As described hereinabove, in accordance with the present invention, the standing vibration wave is generated by the electro-mechanical energy conversion means prior to the start so that the vibration energy is stored in the vibration member without moving the movable member. Accordingly, the start-up characteristic is improved.

What is claimed is:

1. A drive system for a vibration wave motor comprising:
    a pair of electrostrictive element groups arranged or polarized phase-differentially, said electrostrictive element groups each including at least one electrostrictive element;
    a vibration member for generating a travelling vibration wave when phase-differential voltages are applied to said pair of electrostrictive element groups;
    a movable member press-contacted to said vibration member to be friction-driven thereby;
    first means for converting a DC voltage to a pulse signal for application to one of said pair of electrostrictive element groups;
    second means for converting a DC voltage to a pulse signal for application to the other of said pair of electrostrictive element groups, said pulse signal of said second means having a phase difference from said pulse signal of said first means; and
    enabling means for enabling one or both of said first and second means, said enabling means including switching means to switch from the state in which one of said first and second means are enabled to the state in which both of said first and second means are enabled.

2. A vibration wave motor comprising:
    a vibration member;
    a movable member contacted to said vibration member to be friction-driven thereby;
    electro-mechanical energy conversion means capable of generating a travelling vibration wave and a standing vibration wave in said vibration member;
    first means for causing said conversion means to generate the standing vibration wave;
    second means for causing said conversion means to generate the travelling vibration wave; and
    switching means for enabling one or the other of said first and second means.

3. A lens drive unit having a vibration wave motor comprising:
    a pair of electrostrictive element groups arranged or polarized phase-differentially, said electrostrictive element groups each including at least one electrostrictive element;
    a vibration member for generating a travelling vibration wave when phase-differential voltages are applied to said pair of electrostrictive element groups;
    a movable member press-contacted to said vibration member to be friction-driven thereby, said movable member driving a lens;
    first means for converting a DC voltage to a pulse signal for application to one of said pair of electrostrictive element groups;
    second means for converting a DC voltage to a pulse signal for application to the other of said pair of electrostrictive element groups, said pulse signal of said second means having a phase difference from said pulse signal of said first means; and
    enabling means for enabling one or both of said first and second means, said enabling means including switching means to select a first state in which one of said first and second means are enabled or a second state in which both of said first and second means are enabled, said switching means selects said second state in an automatic lens drive mode and selects said first state in a manual lens drive mode.

4. A lens drive unit according to claim 3 wherein said switching means includes an auto/manual selection switch.

5. A lens drive unit having a vibration wave motor comprising:
    a pair of electrostrictive element groups arranged or polarized phase-differentially, said electrostrictive element groups each including at least one electrostrictive element;
    a vibration member for generating a travelling vibration wave when phase-differential voltages are applied to said pair of electrostrictive element groups;
    a movable member press-contacted to said vibration member to be friction-driven thereby, said movable member driving a lens;
    first means for converting a DC voltage to a pulse signal for application to one of said pair of electrostrictive element groups;
    second means for converting a DC voltage to a pulse signal for application to the other of said pair of electrostrictive element groups, said pulse signal of said second means having a phase difference from said pulse signal of said first means;
    switching means for applying the DC voltage to said first means and said second means;
    signal generating means for generating a lens drive start signal; and
    enabling means for enabling one or both of said first and second means, said enabling means enabling one of said first and second means in response to the actuation of said switching means and enabling both of said first and second means in response to said lens drive start signal from said signal generating means.

6. A system of a vibration wave motor comprising:
    (a) vibration means comprising electro-mechanical energy conversion elements for generating a traveling wave or a standing wave by the vibration generated in said elements;
    (b) a driven member contacting said vibration means and friction-driven by said vibration member, the position of said driven member being relatively changed with respect to that of said vibration means;
    (c) applying means for applying a periodic signal to said electro-mechanical energy conversion elements, said applying means having a first state in which said applying means causes said vibration means to generate the traveling wave, and a second state in which said applying means causes said vibration member to generate the standing wave; and
    (d) switch-over means for switching over between said first state and said second state.

7. A system according to claim 6, wherein said vibration means include:
    (a) a first electro-mechanical conversion element;
    (b) a second electro-mechanical conversion element, said second element being phase differentially arranged with respect to said first element; and
    (c) a vibration member on which said first and second elements are provided.

8. A system according to claim 7, wherein said applying means include:
(a) first means for applying a periodic signal to said first element;
(b) second means for applying a periodic signal which is phase-differentially arranged with respect to said a periodic signal applied by said first means, to said second element;
(c) control means for operating either said first means or said second means when the state of said applying means has been changed to said first state by said switch-over means and for operating both of said first and second means when the state of said applying means has been changed to said second state.

9. A system according to claim 6, wherein said system further comprises:
(a) preparation means for causing said system to prepare the state thereof so as to be able to start the operation of sid system; and
(b) means for causing said switch means to change the state of said applying means to said second state when the state of said system has been prepared by said preparation means so as to be able to start the operation of said system.

10. A system according to claim 6, wherein said electromechanical energy conversion element comprises an electrostrictive element.

11. A system according to claim 6, wherein said switch means causes the state of said applying means to be said first state when said motor is rotated, and said switch means causes the state of said applying means to be said second state when said motor is not rotated.

12. A lens drive apparatus having a vibration motor comprising:
(a) a vibration member comprising electro-mechanical energy conversion elements for generating a traveling wave or a standing wave according to the vibration generated in said elements;
(b) a driven member contacting said vibration member and friction-driven by said vibration member, the position of said vibration member being relatively changed with respect to that of said vibration member; and
(c) switching-over means for switching over between a manual mode in which the standing wave is generated in said vibration member so that a photo-taking lens is driven by manual operation, and an auto mode in which the traveling wave is generated in said vibration member so that the photo-taking lens is driven by said traveling wave.

13. A lens drive apparatus according to claim 12, wherein said driven member comprises a member for driving a distance ring of a photo-taking lens.

14. A lens drive apparatus according to claim 13, wherein said electro-mechanical energy conversion elements comprises electrorestrictive elements.

15. A system comprising:
(a) vibration means including electro-mechanical conversion elements, for generating a wave by the vibration generated in said elements;
(b) a driven member contacting said vibration means, said member being supported such that the relative position of said member to that of said vibration is changed;
(c) applying means for applying a periodic signal to said electro-mechanical energy conversion elements, said applying means having a first state in which said wave to be generated in said vibration means is generated so as to cause said wave to change the relative position, and a second state in which said wave to be generated in said vibration means is generated so as to cause said wave not to change the position of said drive member; and
(d) operating means for operating either said first or second state of said applying means.

16. A system according to claim 15, wherein said vibration means include:
(a) a first electro-mechanical conversion element;
(b) a second electro-mechanical conversion element, said second element being phase differentially arranged with respect to said first element; and
(c) a vibration member on which said first and second elements are provided.

17. A system according to claim 16, wherein said applying means include:
(a) first means for applying a periodic signal to said first element;
(b) second means for applying a periodic signal which is phase-differentially arranged with respect to said a periodic signal applied by said first means, to said second element;
(c) control means for operating either said first means or said second means when the state of said applying means has been changed to said first state by said switch-over means and for operating both of said first and second means when the state of said applying means has been changed to said second state.

18. A system according to claim 15, wherein said system further comprises:
(a) preparation means for causing said system to prepare the state thereof so as to be able to start the operation of said sytem; and
(b) means for causing said switch means to change the state of said applying means to said second state when the state of said system has been prepared by said preparation means so as to be able to start the operation of said system.

19. A system according to claim 15, wherein said electro-mechanical energy conversion element comprises an electrorestrictive element.

20. A system according to claim 15, wherein said first state of said applying means is a state in which a traveling wave is generated in said vibration means, and said second state is a state in which a standing wave is generated in said vibration means.

21. A lens drive apparatus comprising:
(a) a vibration member including electro-mechanical energy conversion elements for generating a wave by the vibration generated in said elements;
(b) a driven member contacted with said vibration member, the relative position of said driven member to that of said vibration wave being changed;
(c) control means for applying a periodic signal to said electro-mechanical energy conversion elements, said control means having a first state in which said wave is generated so as to cause said wave to change said relative position, and a second state in which said wave is generated so as to cause said wave not to change said relative position; and
(d) means for operating either said first or second state of said control means.

22. A lens drive apparatus according to claim 21, wherein said driven member comprises a member for driving a distance ring of a photo-taking lens.

23. A lens drive apparatus according to claim 22, wherein said electro-mechanical energy conversion elements comprises electrorestrictive elements.

* * * * *

UNITED STATES PATENT AND TRADEMARK OFFICE
CERTIFICATE OF CORRECTION

PATENT NO. : 4,560,263
DATED : December 24, 1985
INVENTOR(S) : MAKOTO KATSUMA, ET AL.

It is certified that error appears in the above-identified patent and that said Letters Patent is hereby corrected as shown below:

Column 2, lines 19-20, "phase shifter 6" should read --phase shifter 8--.

Column 8, line 34, "produces" should read --produce--.

Column 9, line 13, "90 retarded" should read --90°-retarded--.

Column 12, line 1, "means selects" should read --means selecting--;
          line 3, "and selects" should read --and selecting--.

Column 13, line 7, "a periodic" should read --periodic--;
          line 20, "sid system;" should read --said system--;
          lines 25-26, "elec- tromechanical" should read --electromechanical--;
          line 55, "electrorestrictive" should read --electrostrictive--.

UNITED STATES PATENT AND TRADEMARK OFFICE
CERTIFICATE OF CORRECTION

PATENT NO. : 4,560,263

DATED : December 24, 1985

INVENTOR(S) : MAKOTO KATSUMA, ET AL.

It is certified that error appears in the above-identified patent and that said Letters Patent is hereby corrected as shown below:

Column 14, line 21, "a periodic" should read --periodic--;
line 41, "electrorestrictive" should read --electrostritive--;
line 51, "contacted with" should read --contacting--.
line 67, "electrorestrictive" should read --electrostrictive--

Signed and Sealed this

Eighteenth Day of November, 1986

Attest:

DONALD J. QUIGG

*Attesting Officer*    *Commissioner of Patents and Trademarks*